US008228026B2

(12) United States Patent
Johnson et al.

(10) Patent No.: US 8,228,026 B2
(45) Date of Patent: *Jul. 24, 2012

(54) INDUCTIVELY COUPLED SHELVING AND STORAGE CONTAINERS

(75) Inventors: LeRoy Johnson, Lowell, MI (US); Caleb Browning, Carthage, MO (US)

(73) Assignee: L & P Property Management Company, South Gate, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 12/391,735

(22) Filed: Feb. 24, 2009

(65) Prior Publication Data

US 2009/0212737 A1    Aug. 27, 2009

Related U.S. Application Data

(60) Provisional application No. 61/031,132, filed on Feb. 25, 2008.

(51) Int. Cl.
*H02J 7/00* (2006.01)
(52) U.S. Cl. ........................ 320/108; 206/370
(58) Field of Classification Search ............... 320/108
See application file for complete search history.

(56) References Cited

U.S. PATENT DOCUMENTS

| 2,861,855 | A |   | 11/1958 | Leshner |
|---|---|---|---|---|
| 4,210,859 | A |   | 7/1980 | Meretsky |
| 4,301,494 | A |   | 11/1981 | Jordan |
| 4,591,777 | A |   | 5/1986 | McCarty |
| 4,647,831 | A |   | 3/1987 | O'Malley |
| 4,672,292 | A |   | 6/1987 | Hernandez |
| 4,739,242 | A |   | 4/1988 | McCarty |
| 5,266,881 | A |   | 11/1993 | Hoffman |
| 5,329,979 | A |   | 7/1994 | Miller et al. |
| 5,536,979 | A |   | 7/1996 | McEachern et al. |
| 5,730,066 | A |   | 3/1998 | Auten et al. |
| 5,736,837 | A |   | 4/1998 | Noda |
| 5,959,433 | A | * | 9/1999 | Rohde ........................ 320/108 |
| 5,963,014 | A |   | 10/1999 | Chen |

(Continued)

FOREIGN PATENT DOCUMENTS

WO    2004038888 A2    5/2004

(Continued)

OTHER PUBLICATIONS

Wo 2004/038888 to Cheng et. al. May 6, 2004.*

(Continued)

*Primary Examiner* — Samuel Berhanu
(74) *Attorney, Agent, or Firm* — Shook, Hardy & Bacon L.L.P.

(57) ABSTRACT

Inductively coupled shelving units and storage containers with integrated primary coils, as well as inductively coupled systems for storing and charging tools, are provided. Power is inductively coupled from a primary coil to a device containing a secondary coil. Primary coils may be integrated into a shelving unit to charge devices stored on the shelving unit. Primary coils may similarly be integrated into a storage container. Inductively coupled shelving units may also be configured to receive and hold an inductively coupled storage container such as a toolbox. An integrated secondary coil in the toolbox receives power inductively coupled from a primary coil in a shelving unit. Integrated primary coils in the toolbox then inductively couple the received power to secondary coils in individual devices. Integrated primary coils may provide varying amounts of power.

18 Claims, 4 Drawing Sheets

U.S. PATENT DOCUMENTS

| | | | |
|---|---|---|---|
| 6,041,722 | A | 3/2000 | Baker |
| 6,055,911 | A | 5/2000 | Krenzer |
| 6,104,162 | A | 8/2000 | Sainsbury |
| 6,162,071 | A | 12/2000 | Muller |
| 6,204,744 | B1 | 3/2001 | Shafer et al. |
| 6,331,744 | B1 | 12/2001 | Chen et al. |
| 6,379,182 | B1 | 4/2002 | Byrne |
| 6,586,909 | B1 | 7/2003 | Trepka |
| 6,641,190 | B2 | 11/2003 | Kirchhoff |
| 6,803,744 | B1 | 10/2004 | Sabo |
| 6,811,233 | B1 | 11/2004 | Packer |
| 6,975,198 | B2 | 12/2005 | Baarman et al. |
| 7,077,179 | B1 | 7/2006 | Camiano et al. |
| 7,083,421 | B1 | 8/2006 | Mori |
| 7,109,682 | B2 * | 9/2006 | Takagi et al. ............... 320/108 |
| 7,132,918 | B2 | 11/2006 | Baarman |
| 7,164,255 | B2 | 1/2007 | Hui |
| 7,211,986 | B1 * | 5/2007 | Flowerdew et al. .......... 320/108 |
| 7,239,110 | B2 | 7/2007 | Cheng et al. |
| 7,248,017 | B2 | 7/2007 | Cheng et al. |
| 7,262,700 | B2 | 8/2007 | Hsu |
| 7,271,569 | B2 | 9/2007 | Oglesbee |
| 7,375,492 | B2 | 5/2008 | Calhoon et al. |
| 7,375,493 | B2 | 5/2008 | Calhoon et al. |
| 7,378,817 | B2 | 5/2008 | Calhoon et al. |
| 7,405,536 | B2 | 7/2008 | Watts |
| 7,408,324 | B2 | 8/2008 | Baarman et al. |
| 7,522,878 | B2 | 4/2009 | Baarman |
| 2002/0008044 | A1 * | 1/2002 | Burrus et al. ............... 206/373 |
| 2004/0195767 | A1 | 10/2004 | Randall |
| 2005/0007067 | A1 | 1/2005 | Baarman et al. |
| 2005/0140482 | A1 | 6/2005 | Cheng et al. |
| 2005/0156560 | A1 * | 7/2005 | Shimaoka et al. ............ 320/107 |
| 2006/0043927 | A1 | 3/2006 | Beart et al. |
| 2006/0061323 | A1 | 3/2006 | Cheng et al. |
| 2006/0075862 | A1 | 4/2006 | Parks et al. |
| 2006/0100764 | A1 | 5/2006 | Adams et al. |
| 2006/0131193 | A1 * | 6/2006 | Sherman ..................... 206/370 |
| 2006/0202665 | A1 | 9/2006 | Hsu |
| 2007/0182367 | A1 | 8/2007 | Partovic |
| 2007/0236174 | A1 * | 10/2007 | Kaye ........................... 320/107 |
| 2007/0247005 | A1 | 10/2007 | Tetlow |
| 2007/0279002 | A1 | 12/2007 | Partovi |
| 2008/0129246 | A1 | 6/2008 | Morita |
| 2009/0072782 | A1 | 3/2009 | Randall |
| 2009/0079387 | A1 | 3/2009 | Jin et al. |
| 2009/0153098 | A1 | 6/2009 | Toya et al. |
| 2009/0158971 | A1 | 6/2009 | Carter |
| 2009/0179611 | A1 | 7/2009 | Sander et al. |
| 2009/0212637 | A1 | 8/2009 | Baarman et al. |
| 2009/0212639 | A1 | 8/2009 | Johnson |
| 2010/0038970 | A1 | 2/2010 | Cook et al. |
| 2010/0164298 | A1 | 7/2010 | Karalis et al. |

FOREIGN PATENT DOCUMENTS

| | | |
|---|---|---|
| WO | 2005086313 | 9/2005 |
| WO | 2009047768 A2 | 4/2009 |
| WO | 2009/108959 | 9/2009 |

OTHER PUBLICATIONS

PCT Notification of Transmittal of International Preliminary Report on Patentability, Mail Date: Jan. 11, 2011, PCT/US09/41508, Applicant: L & P Property Management Company, 12 pages.

International Search Report, mailed Jul. 7, 2009 re Appl. No. PCT/US09/41508, (11 pages).

Non-Final Office Action mailed Aug. 19, 2010 re U.S. Appl. No. 12/391,714, filed Feb. 24, 2009, (20 pages).

Non-Final Office Action mailed Aug. 19, 2010 re U.S. Appl. No. 12/391,698, filed Feb. 24, 2009, (17 pages).

PCT Notification of Transmittal of the International Search Report and the Written Opinion mailed Jul. 6, 2009_re_Appl. No. PCT_US09_41513_(11 pages).

PCT Notification of Transmittal of International Preliminary Report on Patentability mailed Aug. 13, 2010 re Appl. No. PCT/US09/41513 (56 pages).

PCT Notification of Transmittal of International Search Report and the Written Opinion of the International Searching Authority, or the Declaration mailed Nov. 4, 2010 regarding Appl. No. PCT/US2010/1048053.

Final Office Action mailed Feb. 4, 2011 re U.S. Appl. No. 12/391,714, filed Feb. 24, 2009, 12 pages.

Final OA mailed Feb. 16, 2011 re U.S. Appl. No. 12/391,698, filed Feb. 24, 2009, 11 pages.

Non-final Office Action mailed Sep. 1, 2011, U.S. Appl. No. 12/391,698, 11 Pages.

Final Office Action mailed Apr. 23, 2010, in U.S. Appl. No. 12/391,698, 17 pp.

Non final Office Action mailed Apr. 25, 2012, in U.S. Appl. No. 12/391,714, 34 pp.

* cited by examiner

INDUCTIVELY COUPLED SHELVING AND STORAGE CONTAINERS

CROSS-REFERENCE TO RELATED APPLICATIONS

This application claims priority to U.S. provisional application 61/031,132, filed Feb. 25, 2008, which is hereby incorporated by reference.

BACKGROUND

One of the problems associated with many of the electronics so common in today's world is the necessity for the cords and cables associated with the various electronic devices. Rechargeable cordless devices are a common alternative. These devices still require charging and the associated cords and cables to accommodate this charging.

Technology has been developed to address these limitations by providing an inductively coupled power circuit. This circuit dynamically seeks resonance and optimizes power transfer from a primary coil to a secondary device with a secondary coil. This power transfer can occur under multiple, varying load conditions. By using this circuit, the primary supply circuit adapts its operation to match the needs of the secondary devices being supplied with power. The circuit also allows the primary supply circuit to supply power to multiple secondary devices simultaneously.

SUMMARY

Intelligent, inductively coupled power circuits have been developed to transfer power from a source to a device without the need for a wired connection. Primary coils inductively couple power to secondary coils integrated into devices such as laptop computers, PDAs, cell phones, and power tools. Embodiments of the present invention incorporate this inductive coupling technology into shelving units, storage containers, and systems for charging and storing devices.

In one embodiment, primary coils are integrated into shelves of a shelving unit. Primary coils of low, medium, and high power can be integrated into the shelves in any position, number, and combination. The shelving unit may be installed in a vehicle.

In another embodiment, primary coils are integrated into a storage container. Primary coils of low, medium, and high power can be integrated into the storage container in any position, number, and combination. The storage container may be a toolbox configured to receive and hold devices containing secondary coils. The storage container may also contain an integrated secondary coil configured to receive power inductively coupled from an external primary coil.

In yet another embodiment, a system of storing and charging tools is provided. A shelving unit with primary coils integrated into the shelves is configured to receive an inductively coupled storage container. The storage container contains an integrated secondary coil configured to receive power inductively coupled from a primary coil integrated into the shelves. The power inductively coupled to the storage container is then again inductively coupled from primary coils integrated into the storage container to secondary coils in devices. The system may be installed in a vehicle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Embodiments of the present invention are described with specificity herein to meet statutory requirements. However, the description itself is not intended to limit the scope of this patent. Rather, the inventor has contemplated that the claimed subject matter might also be embodied in other ways.

As noted in the background section, technology has been developed that provides an intelligent, inductively coupled power circuit. This circuit dynamically seeks resonance and optimizes power transfer from a primary coil to a secondary device with a secondary coil. The circuit allows the primary coil to determine and provide the power needs of the secondary device. By using this circuit, the primary supply circuit adapts its operation to match the needs of the secondary devices being supplied with power. The circuit also allows the primary supply circuit to supply power to multiple secondary devices simultaneously. Examples of the circuit and the operation of the circuit are contained in the following U.S. Patents, all of which are hereby incorporated by reference: U.S. Pat. Nos. 6,436,299; 6,673,250; 6,731,071; 6,806,649; 6,812,645; 6,831,417; 6,917,163; 6,975,198; 7,116,200; 7,118,240; 7,126,450; and 7,132,918.

The primary coils necessary to form an inductively coupled power circuit as described above may be integrated in shelving units. Shelving units with integrated primary coils may be traditional shelving units in a room or office or the shelving units may be installed in a vehicle.

Figure 1:
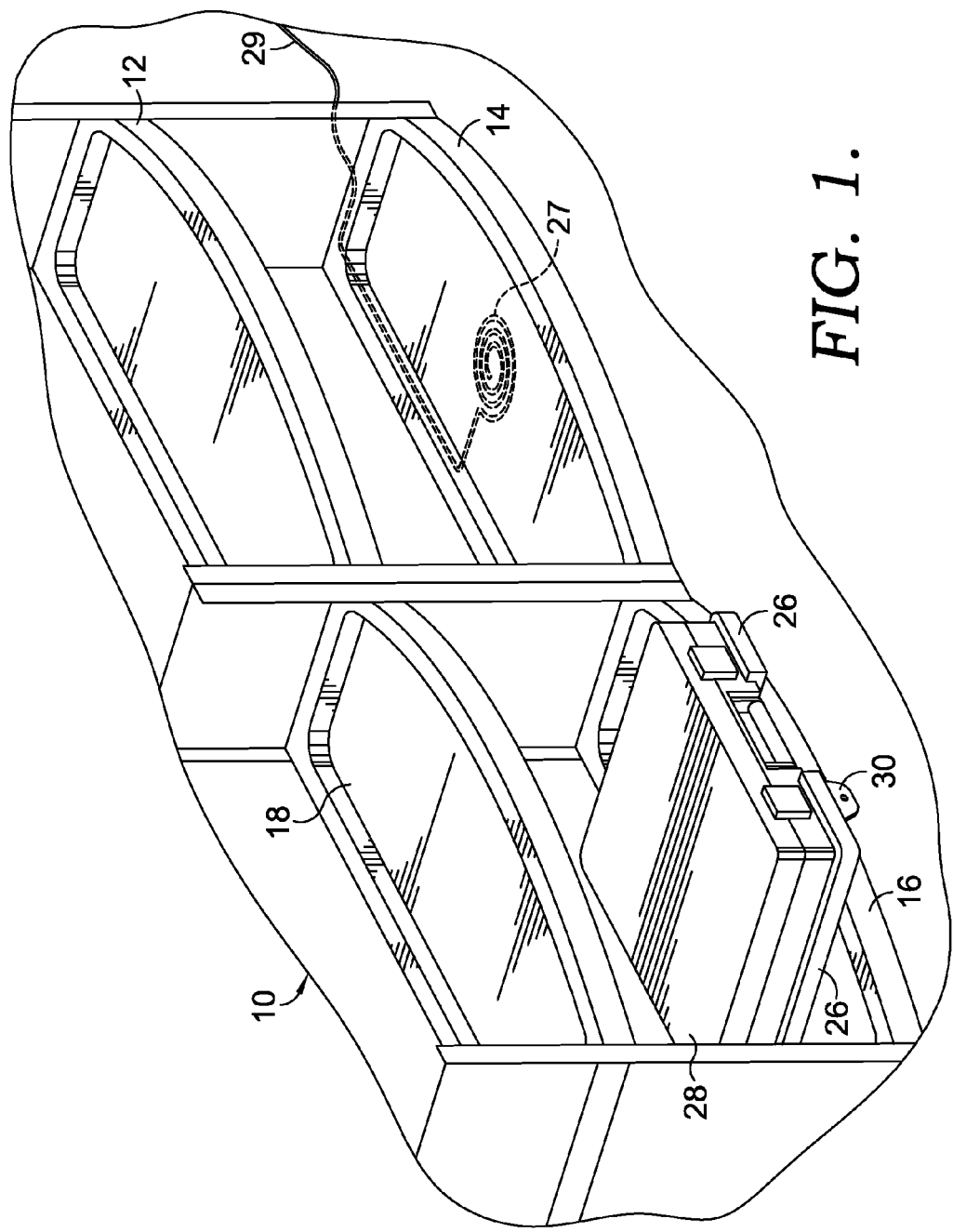
FIG. 1 is a partial perspective view of an inductively coupled shelving unit.

FIG. 1 shows a section of a shelving unit. Shelving unit 10 contains shelves 12, 14, 16, and 18. Although four shelves are shown in FIG. 1, an inductively coupled shelving unit could contain any number of shelves. Docking area 26 is attached to shelf 16 and equipped with a primary coil. The primary coil could be attached to the surface of docking area 26, attached underneath docking area 26, or embedded within docking area 26. The primary coil could alternatively be integrated into shelf 16 rather than docking area 26. In one such embodiment, a cylindrical hole is bored in the shelf, and a primary coil is attached from underneath the shelf such that the top of the primary coil is flush with the shelf surface. A primary coil 27 may also be installed beneath a shelf, attached by screws, bolts, a support bracket, or any other means. In other embodiments, a primary coil 27 could be embedded in a shelf, with a power cord 29 either leading from the edge of the shelf or run through hardware supporting the shelving unit.

With continued reference to FIG. 1, if shelving unit 10 is installed in a vehicle, the primary coil integrated into docking area 26 may draw power from the battery or electrical circuitry of the vehicle. A shelving unit in a building may power the integrated primary coil through a connection to an electrical outlet. Docking area 26 is formed to provide a friction fit with tool case 28. Although a tool case is shown in FIG. 1, the shelving unit could be configured to receive and hold any inductively coupled storage container. Clasps, locking mechanisms, or other means for securing tool case 28 with docking area 26 are also contemplated. The fit allows tool case 28 to be removed from docking area 26 for use, while maintaining the case 28 in place during storage. For implementation in a vehicle, the friction fit described above ensures that case 28 remains in place during transit.

An inductively coupled storage container could also simply rest on an inductively coupled shelving unit without docking surface 26. In such an embodiment, a primary coil would be integrated into shelf 16. A primary coil could also be integrated into shelf 16 rather than docking surface 26 even when docking surface 26 is used. In other embodiments, multiple primary coils are embedded or otherwise integrated into shelf 16 or docking surface 26. In embodiments with multiple primary coils, the multiple primary coils may be controlled by a single control circuit.

With continuing reference to FIG. 1, docking area 26 includes a small indicator light 30 that illuminates when the case 28 is properly in place and is charging. Case 28 preferably houses a line of cordless power tools. The power tools are equipped with either a common secondary coil and battery pack unit, or are all equipped with individual batteries and secondary coil units. Other devices containing secondary coils, such as portable computers and other portable electronic devices, could also be stored in an inductively coupled storage container that fits with docking area 26. Case 28 is configured to distribute power inductively coupled from the primary coil within docking area 26 to the various secondary coils within case 28. More specifically and as further described below, the primary coil in docking area 26 distributes power to a secondary coil integrated into case 28. The secondary coil integrated into case 28 distributes power to a number of primary coils integrated into the case. These integrated primary coils then inductively couple power to the secondary coils in the battery pack units. This embodiment allows the tools to charge when not in use. For shelving installed in a vehicle, tools would be able to charge while a service vehicle travels from job site to job site, allowing a worker to arrive at any job site with charged tools. In another embodiment, the primary coil in docking area 26 could inductively couple power directly to a secondary coil contained in a battery pack unit of a device.

Figure 3:
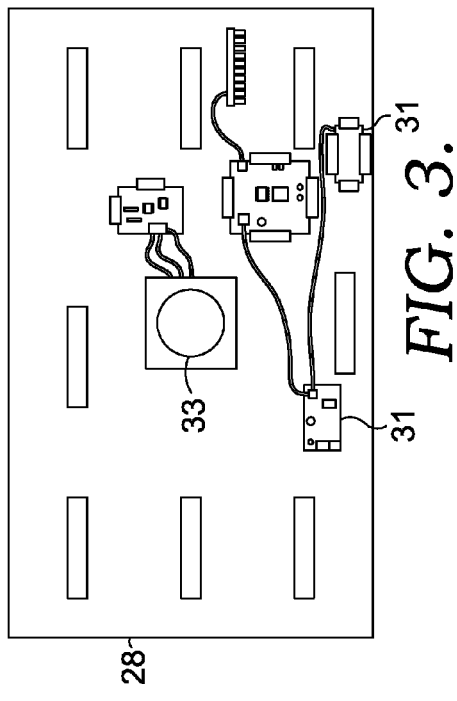
FIG. 3 is a bottom orthogonal view of the inductively coupled storage container of FIG. 2 with the bottom outer casing removed.
Figure 4:
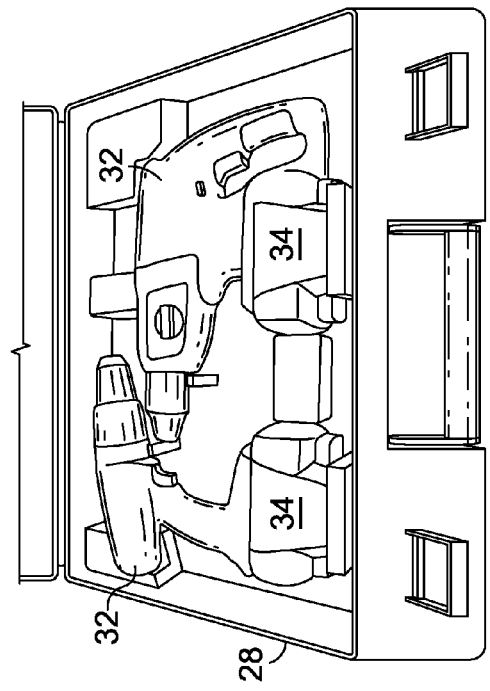
FIG. 4 is a partial perspective view of the inductively coupled storage container of FIG. 2.
Figure 2:
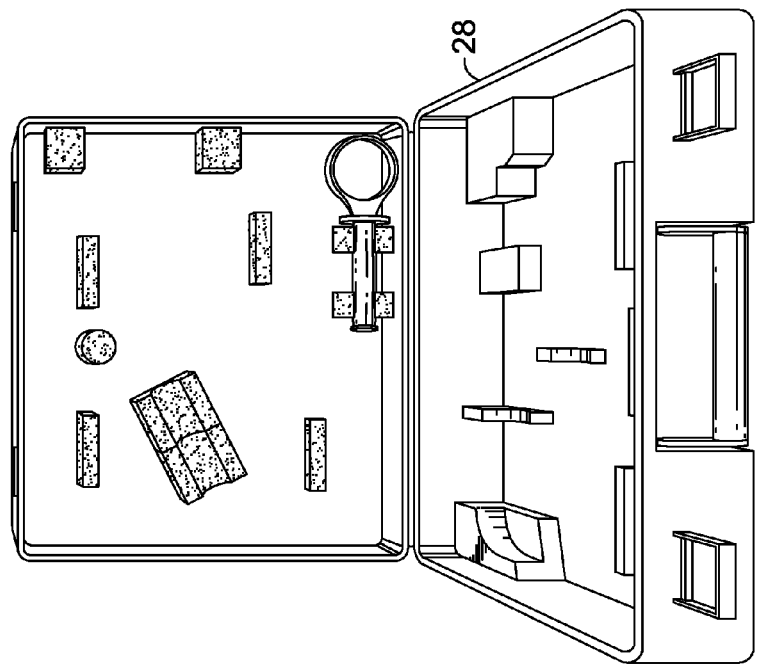
FIG. 2 is a perspective view of an inductively coupled storage container.

A detailed view of case 28 is shown in FIGS. 2-4. As shown in FIGS. 2 and 4, case 28 is designed to house one or more power tools 32. The power tools are cordless and have associated battery packs 34. Case 28 is designed to orient the power tools and hold them in place. More specifically, case 28 has formed docking areas in the bottom of the case for each of a number of tools. These docking areas are designed to orient battery pack 34 of the tool directly over a primary coil in case 28. FIG. 2 shows case 28 without tools.

FIG. 3 shows the interior of the bottom of case 28, which is provided with a number of circuits and primary coils 31. As stated above, the primary coils 31 are oriented to deliver power to the battery packs of the tools. The primary coils integrated into case 28 receive power from the secondary coil 33 integrated into case 28, which receives power inductively coupled from the primary coil integrated into docking area 26. The primary coils integrated into case 28 may be controlled by individual circuits or by a single circuit control mechanism. In embodiments with a plurality of primary coils, a single circuit may control all of the plurality of primary coils.

Figure 5:
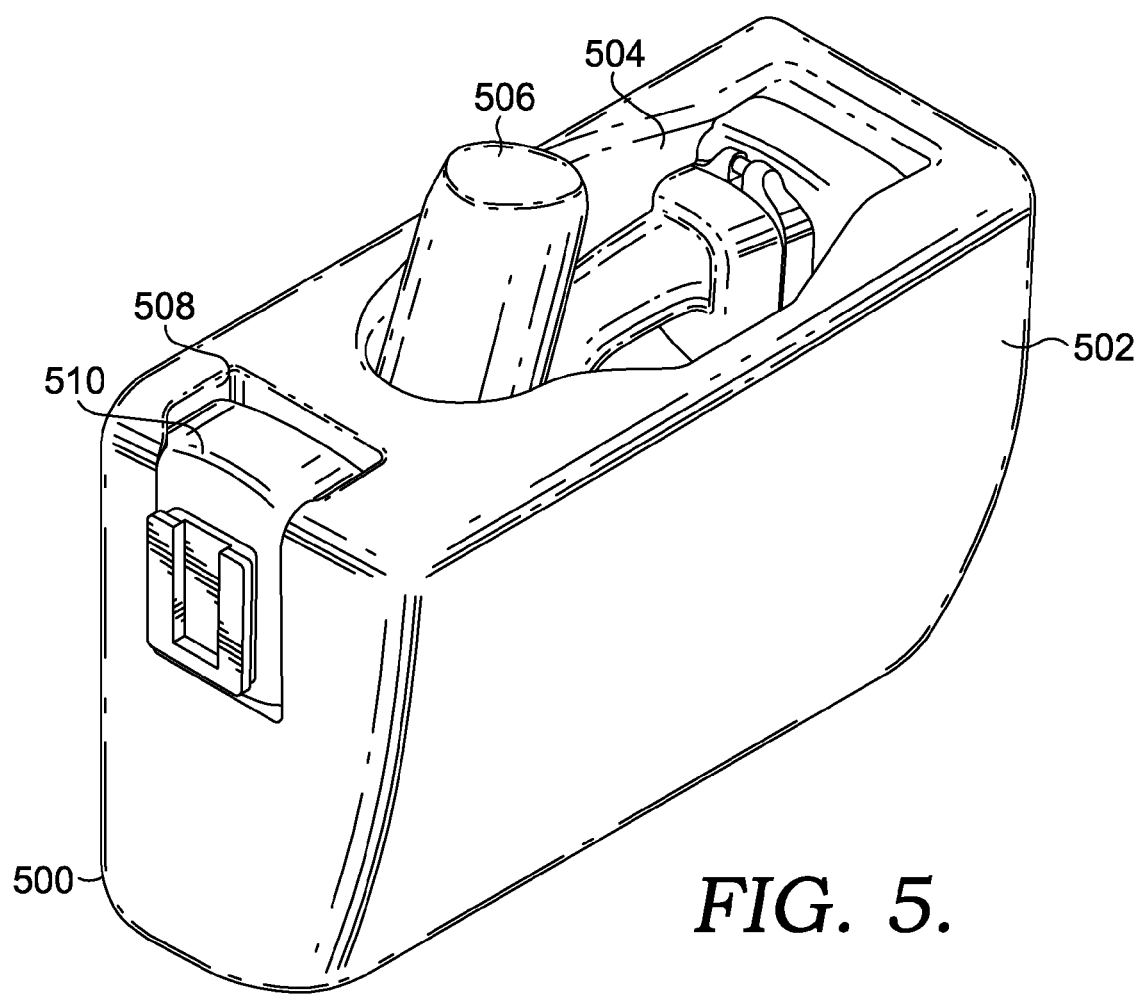
FIG. 5 is a perspective view of an inductively coupled tool holster.
Figure 6:
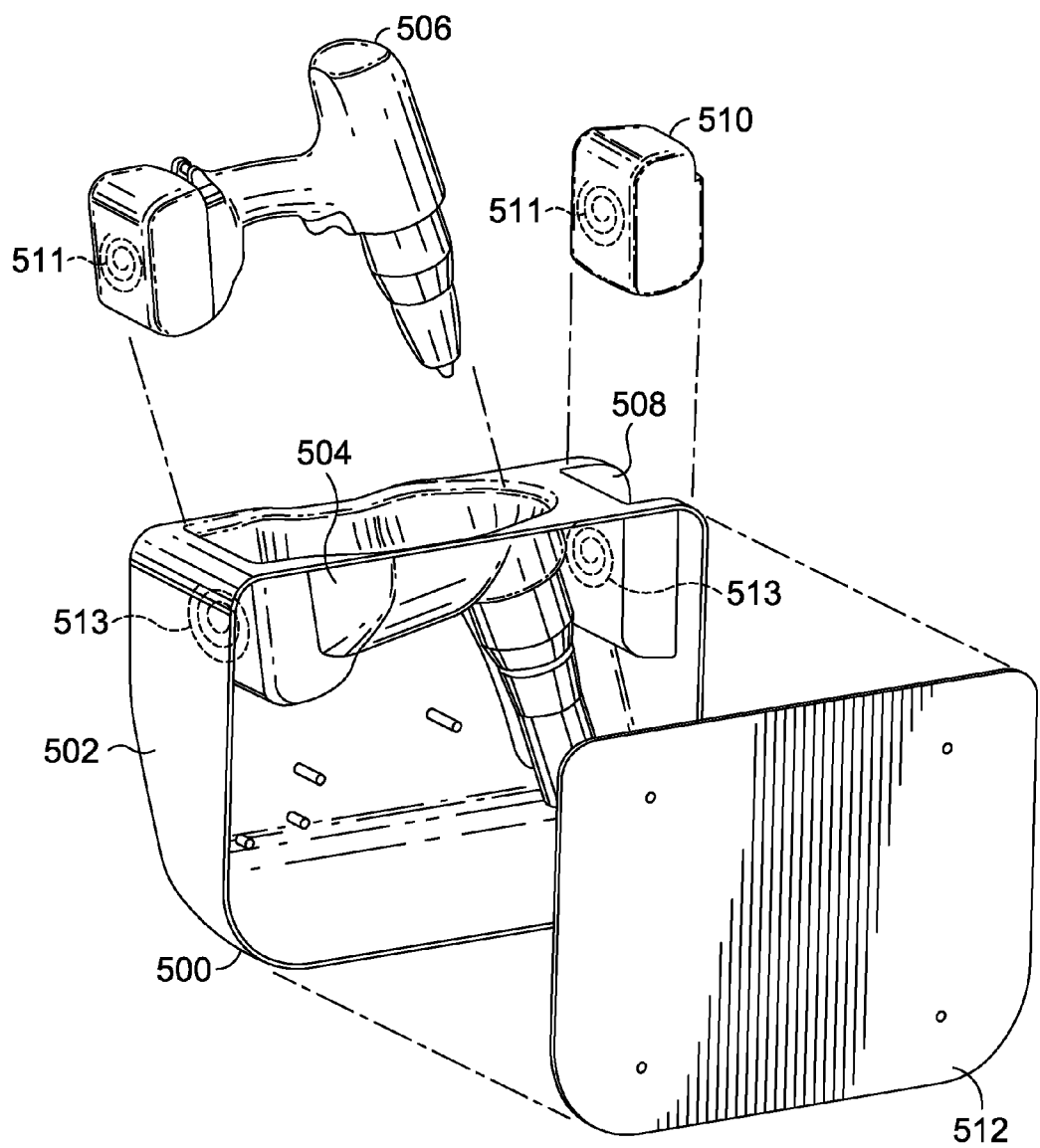
FIG. 6 is an exploded perspective view of the inductively coupled tool holster of FIG. 5.

FIGS. 5 and 6 illustrate an exemplary embodiment in which the inductively coupled storage container is a tool holster 500. Holster body 502 contains molded compartment 504 configured to receive and hold cordless drill 506. Cordless drill 506 can easily be removed for use and charges when stored in tool holster 500. Molded compartment 504 is best seen in FIG. 6. In other embodiments, holster body 502 could contain one or more molded compartments for receiving and holding other devices containing secondary coils. A primary coil is embedded or otherwise installed in holster body 502 in close proximity to each molded compartment such that power is inductively coupled from each primary coil to each secondary coil in a device. In FIG. 5, a primary coil is embedded or otherwise installed in holster body 502 such that when cordless drill 506 is placed in molded compartment 504, the secondary coil in cordless drill 506 is in close proximity with the primary coil in holster body 502, and power is inductively coupled from the primary coil to the secondary coil.

With continued reference to FIGS. 5 and 6, in some embodiments, holster body 502 also contains molded compartment 508 that is configured to receive and hold extra battery 510, which contains a secondary coil 511. A primary coil 513 is embedded or otherwise installed in holster body 502 in close proximity to molded compartment 508 such that extra battery 510 charges while stored in molded compartment 508. Still further embodiments include multiple primary coils 513 able to charge multiple devices containing secondary coils 511.

With continued reference to FIGS. 5 and 6, holster body 502 is tapered such that it is wider on top than on bottom. One side of holster body 502 is substantially flat. With reference now to FIG. 6, side panel 512 comprises the substantially flat side. Tool holster 500 can be installed against a side surface, such as a vehicle wall or building wall. When installed against a side surface, side panel 512 is screwed, bolted, mounted in a bracket, or otherwise installed against the side surface. If tool holster 500 is installed in a vehicle, the embedded primary coils receive power from the vehicle's battery or engine. If tool holster is installed on a building wall, the primary coils may receive power from an electrical outlet or battery.

Primary coils may be low, medium, or high power. Low power primary coils provide up to about approximately 20 watts of power. Medium power primary coils provide between about approximately 20 and 100 watts of power. High power primary coils provide greater than about approximately 100 watts of power. Any number and combination of primary coils may be integrated into docking area 26 and shelves 12, 14, 16, and 18 of FIG. 1.

Returning to FIG. 1, for embodiments in which a primary coil in integrated directly into shelves 12, 14, 16, or 18, and no docking surface is used, indicators are preferably used to facilitate proper placement of inductively coupled storage containers. Specifically, an outline of the area, along with logos, pictures or other indicia, is preferably provided on shelves 12, 14, 16, or 18. An indicator light may be present for each primary coil integrated into shelves 12, 14, 16, or 18. More specifically, an indicator light is embedded below the shelf surface and covered with a material that allows the light to pass through, such as Plexiglas. The indicator lights may turn on when a device is placed over a respective primary coil and is charging. Other indicators, such as dark lines, may outline charging areas for each primary coil. Outlining of charging areas may also be done with LEDs or other illuminated indicators.

In embodiments described herein with a plurality of primary coils, a single circuit may control all of the plurality of primary coils.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. An inductively coupled shelving unit, comprising:
   a shelving unit having a shelf;
   a first primary coil integrated into the shelf and connected to a power source, the first primary coil being capable of inductively coupling power to a device containing a secondary coil;
   one or more indicators on a surface of the shelf that show a charging area for the first primary coil, the charging area being an area within which inductive coupling between the first primary coil and a secondary coil can be achieved;
   an inductively coupled storage container including
      a first secondary coil associated with an exterior surface of the container to provide proximity and alignment with the first primary coil when the container is placed on the shelf,
      a first compartment removeably retaining therein a first device having a second secondary coil, the first compartment including a second primary coil associated therewith and positioned for alignment with the second secondary coil,
      a second compartment removeably retaining therein a second device having a third secondary coil, the second compartment including a third primary coil associated therewith and positioned for alignment with the third secondary coil, and
      a distribution circuit that electrically couples between the first secondary coil and the second and third primary coils; and
   a docking unit that is coupled to the shelf over the charging area and that accepts the storage container, the storage container being removeably disposed in the docking unit and the docking unit retaining the storage container against lateral movement of the storage container in a plane parallel to the shelf.

2. The inductively coupled shelving unit of claim 1, wherein the first, second, and third primary coils are a combination of primary coils selected from the group consisting of low power primary coil, medium power primary coil, and high power primary coil.

3. The inductively coupled shelving unit of claim 1, wherein the inductively coupled storage container is a toolbox.

4. The inductively coupled shelving unit of claim 1, wherein the shelving unit is installed in a vehicle.

5. The inductively coupled shelving unit of claim 1, wherein a plurality the first primary coils is integrated into one or more shelves, and wherein the plurality of the first primary coils is controlled by a single circuit.

6. The inductively coupled shelving unit of claim 1, wherein the inductively coupled storage container is a container for photography equipment.

7. The inductively coupled shelving unit of claim 1, wherein the distribution circuit enables adaptation of the second and third primary coils to the power needs of the first and second devices, respectively.

8. The inductively coupled shelving unit of claim 7, wherein the first and second devices are charged simultaneously.

9. An inductively coupled storage container, comprising:
   a docking unit coupled to a shelf; and
   a storage container removably retained in the docking unit and including
      a first secondary coil associated with an exterior surface of the container in proximity and alignment with a primary coil that is associated with the docking unit or the shelf,
      a first compartment configured to receive and removeably retain therein a first electrical device having a battery that includes a second secondary coil, the first compartment including a first primary coil associated therewith and positioned for alignment with the second secondary coil when the first electrical device is disposed in the first compartment,
      a second compartment configured to receive and removeably retain therein a a spare battery having a third secondary coil and being configured for use with the first electrical device, the second compartment including a second primary coil associated therewith and positioned for alignment with the third secondary coil when the spare battery is disposed in the second compartment, and
      a distribution circuit that electrically couples between the first secondary coil and the first and second primary coils, the distribution circuit adapting the second and third primary coils to the power needs of the battery and the spare battery, respectively.

10. The inductively coupled storage container of claim 9, wherein the first, second, and third primary coils are a combination of primary coils selected from the group consisting of low power primary coil, medium power primary coil, and high power primary coil.

11. The inductively coupled storage container of claim 9, wherein the storage container is a toolbox and the first and second devices are tools that contain the second and third secondary coils.

12. The inductively coupled storage container of claim 9, wherein the storage container is a tool holster installed on a side surface.

13. A system for storing and inductively charging devices, comprising:
   a surface;
   a docking unit coupled to the surface;
   a first primary coil integrated into the docking unit, the first primary coil being connected to a power source, and the first primary coil being capable of inductively coupling power to a first secondary coil;
   a storage container storing a plurality of devices each device including a battery associated with a second secondary coil, the first secondary coil being integrated into an exterior portion of the storage container and receiving power inductively coupled from the first primary coil integrated into the docking unit, and the docking unit removeably retaining the storage container;

a plurality of second primary coils integrated into interior compartments of the storage container and being capable of inductively coupling power received by the first secondary coil to the plurality of devices; and a distribution circuit disposed within the storage container that electrically couples the first secondary coil to the plurality of second primary coils.

14. The system of claim 13, wherein the one or more surfaces are shelves in a shelving unit.

15. The system of claim 13, wherein the storage container is a toolbox.

16. The system of claim 13, wherein the system is installed in a vehicle.

17. The inductively coupled shelving unit of claim 2, wherein the low power coil provides up to about 20 watts of power, the medium power coil provides between about 20 watts and about 100 watts, and the high power coil provides greater than about 100 watts of power.

18. The inductively coupled storage container of claim 9, wherein power is supplied to the storage container by inductive coupling between the first secondary coil and a third primary coil associated with a shelf upon which the storage container is placed, and wherein the shelf includes a tray configured to accept and removably retain the storage container, the tray providing alignment of the first secondary coil and the third primary coil for inductive coupling therebetween.

* * * * *